United States Patent [19]

Pryor et al.

[11] 4,324,494
[45] Apr. 13, 1982

[54] DRINK DISPENSING

[75] Inventors: Harry H. Pryor, Crestwood; James J. Schinker, Hazelwood, both of Mo.

[73] Assignee: UMC Industries, Inc., Stamford, Conn.

[21] Appl. No.: 95,209

[22] Filed: Nov. 19, 1979

[51] Int. Cl.³ .............................................. B01F 15/02
[52] U.S. Cl. .................................. 366/156; 222/148; 222/129.3; 366/138; 366/192; 366/196
[58] Field of Search ................ 222/1, 70, 129.1–129.4, 222/144.5, 148; 366/138, 159, 155, 156, 165, 182, 192, 194–196

[56] References Cited

U.S. PATENT DOCUMENTS

| | | | |
|---|---|---|---|
| 2,802,599 | 8/1957 | Callahan et al. | 222/129.4 X |
| 3,013,701 | 12/1961 | Joschko | 222/236 X |
| 3,033,249 | 5/1962 | Tamm | 222/70 X |
| 3,266,670 | 8/1966 | Brooks et al. | 222/129.4 X |
| 3,335,911 | 8/1967 | Stutz | 222/129.4 X |
| 3,424,350 | 1/1969 | Herr et al. | 222/227 X |
| 3,568,887 | 3/1971 | Jacobs et al. | 222/129.4 X |
| 3,671,020 | 6/1972 | Krup | 222/129.4 X |
| 3,710,991 | 1/1973 | Callahan et al. | 222/413 |
| 3,898,861 | 8/1975 | McMillin | 222/148 X |
| 4,030,707 | 6/1977 | Moreton | 366/194 |
| 4,139,125 | 2/1979 | Arzberger et al. | 222/129.4 |

Primary Examiner—David A. Scherbel
Assistant Examiner—Edward M. Wacyra
Attorney, Agent, or Firm—Senniger, Powers, Leavitt and Roedel

[57] ABSTRACT

Drink dispensing apparatus comprising a container for holding a supply of a particulate drink ingredient adapted to be mixed with water to constitute a drink, a dispenser for dispensing a charge of the particulate ingredient from the container through an opening in the container for the mixing of a drink, and a mixing and delivery system for receiving the charge of the particulate ingredient dispensed from the container and a charge of water, mixing the two and delivering the resultant drink into a cup. The mixing and delivery system comprises a blender and a water supply system for providing the charge of water for mixing with the charge of the particulate drink ingredient, the blender having an impeller for mixing the charges while holding them in the blender and having an outlet for flow of the resultant drink out of the blender and into a cup after mixing has been completed. The charges are held in the blender by the impeller, without a valve. A rinsing system is disclosed for delivering a quantity of water to the mixing and delivery system for rinsing the system of residual drink ingredient.

16 Claims, 7 Drawing Figures

DRINK DISPENSING

BACKGROUND OF THE INVENTION

This invention relates to drink dispensing, and more particularly to the dispensing of cold drinks made by mixing particulate drink ingredients (e.g., powdered ingredients for drinks such as lemon or orange flavored drinks, which are often referred to as "powdered juice") with water.

This invention is especially concerned with dispensing of cold drinks made by mixing particulate drink ingredients with water wherein each drink is individually mixed, as distinguished from dispensing drinks from a pre-mixed batch. Problems arise in the dispensing of such drinks due to the difficulty, in many instances, of dissolving the particulate ingredients in water, even in tap water, and more so in water which has been refrigerated for serving cold drinks, and of maintaining the particulate ingredients in solution. Heretofore, it has been the usual practice to dispense from a pre-mixed batch of a drink, made by mixing a particulate drink ingredient with water, maintaining the batch refrigerated, and constantly agitating (e.g., by spraying) the batch to avoid having a particulate ingredient come out of solution and create unsanitary and unsightly conditions. Dispensing of cold drinks made by mixing a particulate drink ingredient with water wherein each drink is individually mixed, as distinguished from dispensing from a pre-mixed batch, has not heretofore been generally successful so far as applicants are aware, due to the problem of dissolving the particulate ingredient in water for each drink and the problem of sanitation.

SUMMARY OF THE INVENTION

Among the several objects of the invention may be noted the provision of apparatus for dispensing cold drinks made by mixing a particulate drink ingredient with water wherein each drink is individually mixed; the provision of such an apparatus wherein the mixing of each drink is effected in a reasonable time; the provision of such an apparatus which is self-cleaning; the provision of such an apparatus which may use unchilled water such as water at tap or room temperature; the provision of such an apparatus which may be used with containers holding different flavors of particulate drink ingredient, each container being adapted to be readily installed in and removed from the apparatus; the provision of such an apparatus which is economical to use and requires relative little servicing; the provision of a blender for such apparatus having a constantly open outlet operable to hold liquid therein during mixing operations and to release the liquid for flow therefrom after mixing is completed; and the provision of an apparatus for dispensing a particulate product which effectively prevents exposure of the product to moisture in the air.

In general, drink dispensing apparatus of this invention comprises a container for holding a particulate drink ingredient adapted to be mixed with water to constitute a drink, means for dispensing a charge of the particulate ingredient from the container for the mixing of a drink, and a mixing and delivery system for receiving the charge of the particulate ingredient dispensed from the container and a charge of water, mixing the two and delivering the resultant drink into a cup. The mixing and delivery system comprises a blender and means for supplying the charge of water for mixing with the charge of the particulate ingredient, the blender having means for mixing the charges while holding them in the blender and having an outlet for flow of the resultant drink out of the blender and into a cup after mixing has been completed.

The blender generally comprises a receptacle having a bottom outlet and an impeller rotatable in the blender formed to impel liquid away from the outlet when the impeller is in operation, thereby to hold liquid in the blender without closing the outlet, the liquid draining out through the outlet when the impeller stops.

The dispenser of this invention generally comprises a container for holding a supply of a particulate product, means for dispensing the product from the container through an outlet in the container comprising an auger rotatable in the container and an electric motor for driving the auger, a closure for the outlet to exclude moisture from entering the container through the outlet, and means for opening the closure upon operation of the motor. The opening means comprises an armature magnetically attractable to the motor by the magnetic field established by the motor when the motor is energized to drive the auger, the armature being biased to a retracted position relative to the field of the motor when the motor is deenergized, the closure being controlled by the armature for movement to its closed position when the motor is deenergized and the armature is thereupon biased to its retracted position.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
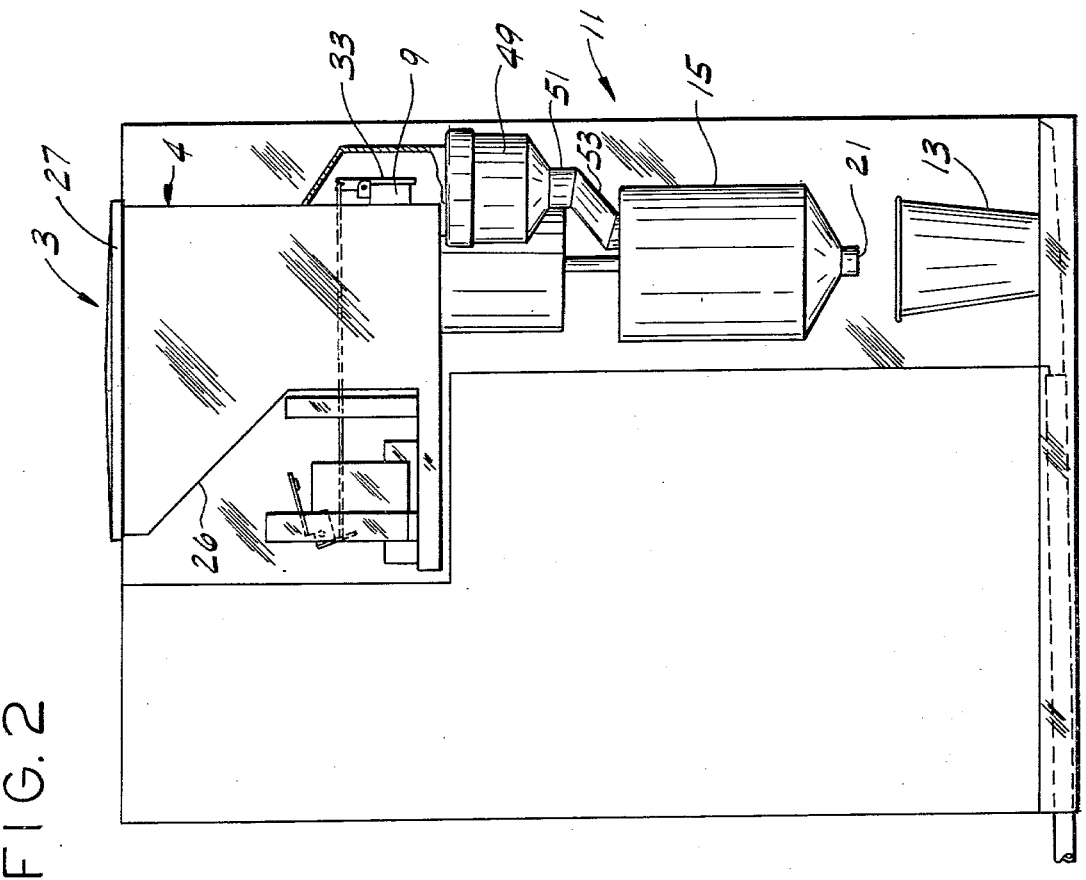
FIG. 1 is a front elevation of dispensing apparatus having two dispensing units of this invention.
Figure 2:
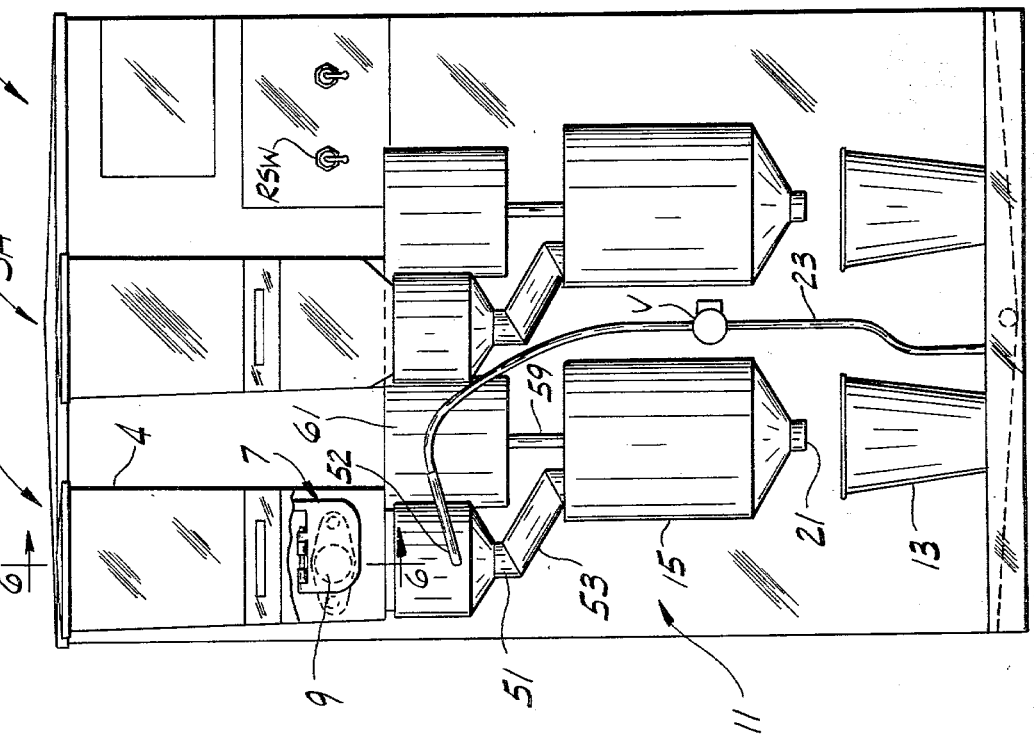
FIG. 2 is a left side elevation of FIG. 1 showing a particulate ingredient container and a blender of one of the units.

Referring to the drawings, first more particularly to FIG. 1, there is indicated at 1 a cold drink dispenser having two dispensing units of this invention generally indicated at 3 and 3A mounted side-by-side. The units 3 and 3A are generally identical, and a description of one will suffice for both.

Figure 4:
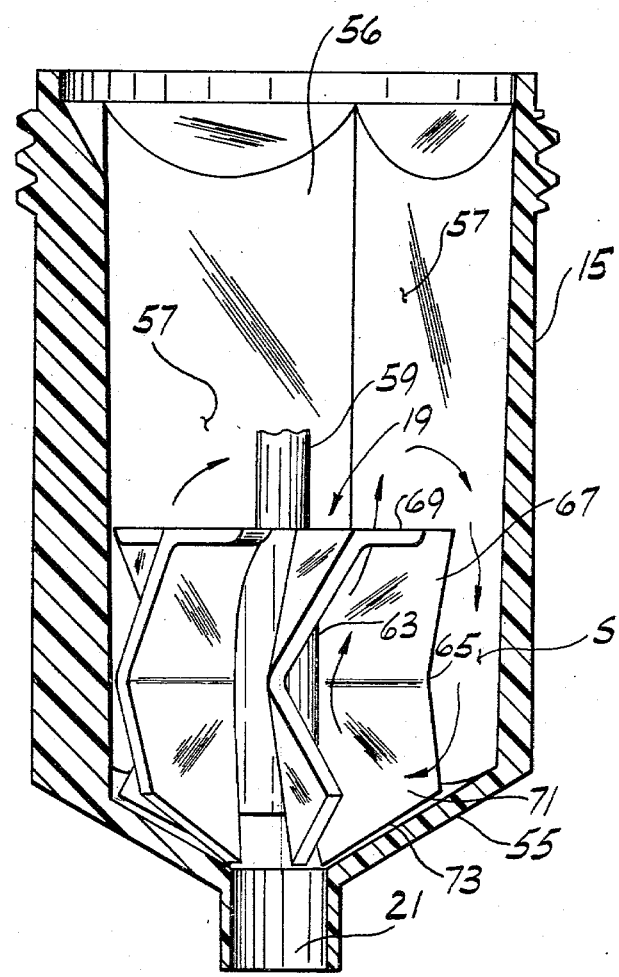
FIG. 4 is a vertical central section of the blender on line 4—4 of FIG. 3 with the impeller shown in elevation.
Figure 5:
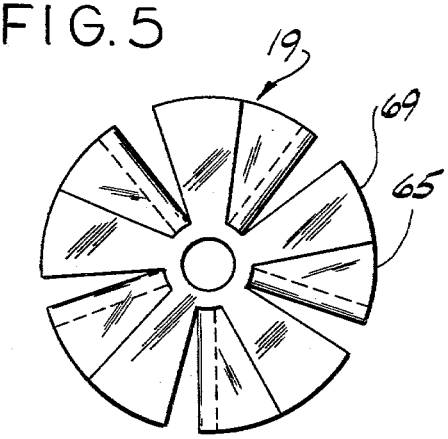
FIG. 5 is a plan of the impeller per se.

The dispensing unit 3 comprises a container or hopper 4 for holding a supply of a particulate drink ingredient 5, (e.g., a lemonade or orange flavor drink) adapted to be mixed with water to constitute a drink, means 7 for dispensing a charge of the drink ingredient from the container through an outlet 9 of the container for the mixing of the drink, and a mixing and delivery system generally indicated at 11 for receiving the charge of the drink ingredient dispensed from the container and a charge of water, mixing the two, and delivering the resultant drink into a cup 13 at a delivery station. The mixing and delivery system comprises a blender 15 and means for supplying the charge of water. The blender 15 has means such as an impeller indicated at 19 in FIGS. 4 and 5 for mixing said charges while holding them in the blender, and an outlet 21 for flow of the resultant drink out of the blender into the cup after mixing has been completed. An auxiliary system is provided for delivering a quantity of water to the mixing and delivery system for rinsing the system 11 of residual drink ingredient. The dispenser 1 is particularly adapted for use in a vendor, and in such case the means for supplying the charge of water may comprise water supply system 23 connected to a tap water source and having a solenoid-operated valve V therein.

The particulate drink ingredient 5, which may be comprised in large measure of sugar, is difficult to dissolve and hold in solution in water for extended periods of time, particularly in cold water, and may also have a tendency to cake when exposed to moisture in the air over a period of time (i.e., the drink ingredient may be hygroscopic). Preferably, the charge of water is introduced into the blender 15 at ambient temperature (i.e., room or tap temperature) so as to reduce the time required to mix the drink ingredient in water, and may be cooled by ice in the cup 13. However, it is also contemplated that chilled water (e.g., water delivered from a refrigeration unit (not shown) in the apparatus may be supplied to the blender in cetain instances.

Figure 6:
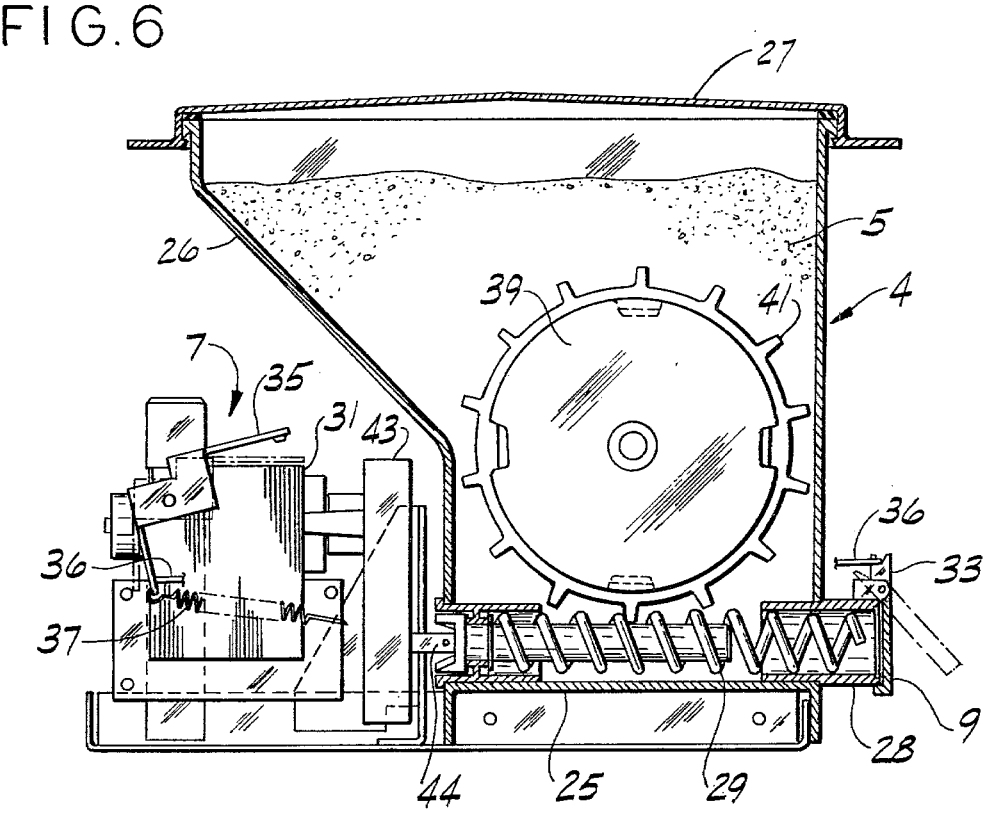
FIG. 6 is an enlarged section of a container taken on line 6—6 of FIG. 1.

The container 4 is removably mounted on a support in the apparatus above the mixing and delivery system 11, and has a closed bottom 25, a front wall (the wall toward the right as shown in FIG. 6) and side walls extending generally vertically from the bottom, an inclined rear wall 26 for facilitating the flow of the drink ingredient down to the bottom, and a removable cover 27 adapted to seal the container. The particulate drink ingredient is dispensed from the container through a tubular nozzle 28 in the front wall of the container, the passage in the nozzle constituting the outlet 9. The means 7 for dispensing the particulate ingredient comprises an auger 29 rotatable in the container and extending forward from the rear wall 26 into the nozzle, and an electric motor 31 mounted on the apparatus at the rear of the container for driving the auger. A closure 33 is pivotally mounted at the outer end of the nozzle 28 for pivoting movement between open and closed positions, the closure when in closed position excluding air from entering the container through the nozzle thereby avoiding caking of the drink ingredient in the container. Means for opening the closure upon operation of the dispensing means is provided, comprising a pivotally mounted armature 35 and a link 36 interconnecting the armature and the closure. The armature 35 is magnetically attractable to the motor 31 by the magnetic field established by the motor when the motor is energized to drive the auger and is biased by a spring 37 to a retracted position relative to the motor. The link 36 is connected at its rearward end to the armature 35 and is releasably secured at its forward end to the closure 33. It swings the closure open as the armature 35 pivots down toward the motor, upon energization of the motor, and swings it closed as the armature returns to its retracted position under the bias of the spring upon deenergization of the motor. Rotatably mounted within the container is a disc 39 having a series of teeth 41 at intervals around its circumference engageable with the auger 29. The disc is driven by the auger for breaking apart any caked-together portions of the drink ingredient to facilitate the flow of the drink ingredient down to the auger.

The motor 31 is a gear motor, its speed reduction unit being indicated at 43. A rearward extension 44 of the auger 29 is detachably coupled to the output shaft of the reduction unit, the extension extending through an opening in the rear wall 26 of the container in rotary sealing engagement therewith. Upon operation of the particulate ingredient dispensing means 7, the motor 31 operates for a predetermined time and the auger 29 rotates a predetermined number of turns to dispense a measured charge of the drink ingredient sufficient for a single drink. When the motor is energized, its field coils develop a magnetic field which attracts the armature 35, thereby causing the link 36 to move rearwardly and the closure 33 to pivot to open position for enabling the dispensing of the charge of particulate ingredient through the outlet 9. Alternatively, the container and the means for dispensing the drink ingredient may be of a conventional volumetric type having a disc mounted at the bottom of a container for rotation about a vertically extending axis, the disc being operable to close an outlet at the bottom of the container so as to exclude air from entering the container while dispensing a predetermined volume of the particulate material. It will be understood that the container 4 may be one of a plurality of such containers each holding a particulate drink ingredient of a different flavor, and each being adapted to be removably mounted on the dispensing apparatus with its auger 29 detachably coupled to the gear reduction unit 43 and with its closure 33 releasably secured to the link 36 so as to enable the containers to be readily installed in or removed from the apparatus.

The mixing and delivery system 11 comprises a mixing bowl 49 having an open upper end beneath the outlet 9 for receiving the metered-out charge of drink ingredient, a conical lower portion tapering to an outlet 51 at the bottom thereof, and a generally cylindrical interior surface. A water inlet port 52 extends through the cylindrical interior surface and is angled relative thereto for directing a charge of water from the water supply system 23 into the bowl along a flow path having a tangential component and a slight axial component. A conduit 53 extends from the outlet of the bowl to the blender 15. During a drink dispensing operation, the mixing bowl first receives a charge of drink ingredient and then receives the charge of water flowing around the bowl toward the outlet for initially mixing the drink ingredient and water and carrying the mixture to the blender.

Figure 3:
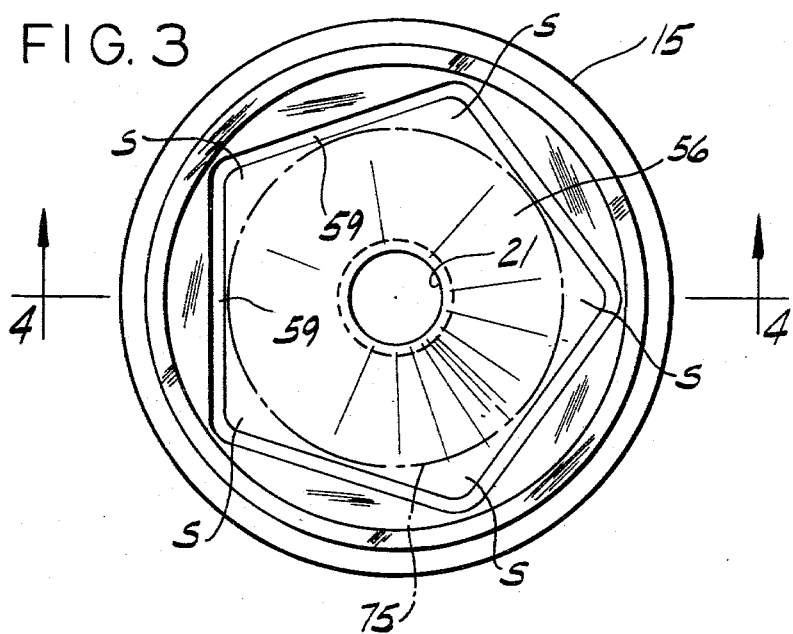
FIG. 3 is a plan of the blender shown in FIG. 2 with the impeller of the blender removed.

The blender 15 has an open top for receiving the mixture from the bowl 49 via the conduit 53, a conical bottom 55 tapering to an opening constituting the outlet 21, and a mixing chamber 56 between the top and bottom. The interior periphery of the mixing chamber is defined by five generally vertical flat surfaces 57 extending up from the conical bottom of the blender, and is polygonal (pentagonal) in transverse section as shown in FIG. 3. The impeller 19 is suspended within the mixing chamber 56 on an output shaft 59 of a motor 61 suitably mounted on the apparatus above the blender. The impeller comprises a hub 63 secured to the lower end of the motor output shaft 59 and a plurality of blades 65 extending radially from the hub 63. Each blade 65 has an upper portion 67 inclined upwardly in the direction of rotation of the impeller 19, a flange 69 at the top of the upper portion extending in the direction of rotation, and a lower portion 71 inclined downwardly in the direction of the rotation of the impeller. The lower portion 71 has an upwardly inclined lower edge 73 extending along a line generally parallel to a radially extending line on the surface of the conical bottom 55 of the blender 15 thereby enabling the impeller 19 to be spaced closely adjacent to the bottom 55. The configuration of the blades 65 and the position of the impeller 19 within the mixing chamber 57 enables the impeller, upon its rotation, to impel the mixture of water and drink ingredient away from the blender outlet 21 and around the internal periphery of the mixing chamber 56 so as to hold the mixture in the blender during the mixing thereof. Moreover, during rotation of the impeller, the radial outer edge of the blades defines a surface of revolution, generally indicated at 75 in FIG. 3, spaces such as indicated at S being defined between said surface of revolution and the interior periphery of the mixing chamber at the corners of its polygonal cross section. The spaces S enable water previously impelled away from the blender outlet 15 to flow back toward the blender outlet, thereby enhancing the mixing action by allowing the water to circulate in the mixing chamber as illustrated by the series of arrows in FIG. 4. Upon stopping the rotation of the impeller, the resultant drink is free to drain out of the blender 15 through the outlet 21 into the cup 13. The impeller thus eliminates the need for a valve at the blender outlet 21 for holding the mixture in the blender during the mixing operation. (Such a valve would be subject to fouling by residual drink ingredient.)

While the axis of the mixing chamber of the blender 15 extends vertically and the impeller 19 is rotatable about this vertical axis, it is contemplated that the apparatus may comprise a second embodiment of the blender (not shown) having a mixing chamber having a horizontal axis and an impeller in the mixing chamber rotatable about the horizontal axis, the blender having an upper inlet and a lower outlet, and the impeller being so constructed relative to the mixing chamber and driven in such direction as to impel the drink ingredient and water away from the blender outlet when in operation, thereby to hold the drink ingredient and the water in the blender for the mixing thereof without closing the blender outlet. The resultant drink drains out of this blender through its lower outlet when the impeller stops. When the axis of its mixing chamber extending horizontally, this second blender embodiment may be made of less height than the blender 15, thus enabling the overall height of the apparatus to be reduced for applications where there may be a height limitation.

While the blender 15, impeller 19, mixing bowl 49, and conduit 53 are configured and arranged so as to reduce build-up of particulate drink ingredient residue on the surfaces thereof, some residual drink ingredient may nevertheless remain on these elements after a drink has been dispensed (i.e., after a drink dispensing cycle). To remove this residual drink ingredient, the auxiliary system delivers a quantity of water to the mixing and delivery system 11, the quantity of water flowing into the cup 13 and completing the drink in the cup, as well as rinsing the mixing and delivery system.

Figure 7:
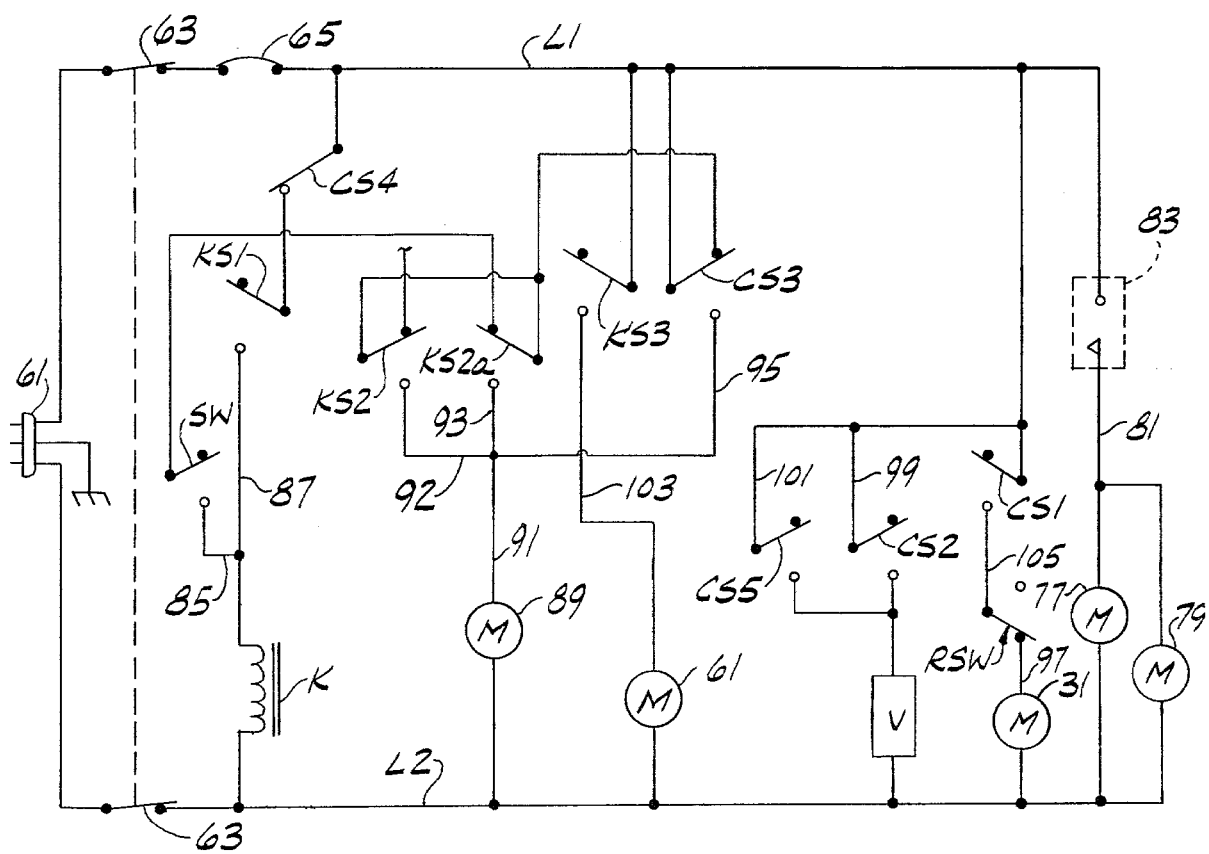
FIG. 7 is a wiring diagram.

To control the operation of the dispensing unit 3 during a drink dispensing cycle and during a rinsing cycle, a control circuit shown in FIG. 7 is provided. It comprises main power lines L1 and L2 for distributing power throughout the control circuit, and a plurality of circuits connected across the power lines. If chilled water for a cold drink is to be supplied to the blender, the control circuit may comprise a compressor motor 77 and a condenser motor 79 in a circuit 81 connected across the lines L1 and L2 including refrigeration contacts (thermostat contacts) 83. To enable initiation of the dispensing cycle, a relay K is provided in a circuit 85 connected across the lines L1 and L2 including a switch SW, two sets of double-throw relay contacts KS2 and KS2a, and a set of double-throw cam-operated contacts CS3. The relay contacts KS2a are controlled by a relay (not shown) for the second dispensing unit 3a, the sets of relays KS2 and KS2a being arranged to prevent the simultaneous dispensing of drinks by the two units 3, 3A. To hold the relay K in energized condition during the dispensing cycle a holding circuit 87 is provided connected across the lines L1 and L2 and including a set of relay contacts KS1 and cam-operated contacts CS4. To program the operation of the dispensing unit for the dispensing and rinsing cycles, a timer motor 89 is provided driving a series of cams (not shown) for controlling the operation of a series of contacts CS1-CS5, the timer motor 90 being in a circuit 91 connected across lines L1 and L2 including in branches 92 and 93 thereof the relay contacts KS2 and KS2a and in another branch 95 thereof the cam-operated contacts CS3. The motor 31 for rotating the auger 29 to dispense the charge of drink ingredient for a drink is in a circuit 97 connected across the lines L1 and L2 including cam-operated contacts CS1. The valve V in the water supply system 23 is in a circuit 99 connected across lines L1 and L2 including cam-operated contacts CS2 operable to energize the valve V for the delivery of the charge of water for mixing with the charge of drink ingredient to form the drink. The auxiliary system comprises cam-operated contacts CS5 in a shunt circuit 101 around contacts CS2, the contacts CS5 being operable to energize the valve V for the delivery of the quantity of water for completing the drink in the cup as well as rinsing the system. The motor 61 for rotating the impeller 19 to mix the drink ingredient and water is in a circuit 103 connected across lines L1 and L3 including relay contacs KS3.

The operation of the dispensing unit 3 is as follows:

Upon closure of the switch SW (which is a selection switch for unit 3), the circuit 85 is completed thereby energizing relay K to move the movable contactors of relay contacts KS1, KS2, and KS3. Upon closure of relay contacts KS1, holding circuit 87 is completed for holding the relay K energized. Circuit 103 is completed upon the closure of relay contacts KS3 thereby energizing the motor 61 to rotate the impeller 19 in the blender 15. Branch 92 of circuit 92 is completed upon closure of the movable contactor of relay contacts KS2 on the lower contact of KS2 thereby energizing the timer motor 89 to program the dispensing unit 3 for the dispensing and rinsing cycles. The timer motor 89 closes cam-operated contacts CS1 and CS2 and moves the movable contactor of cam-operated contacts CS3 down on the lower contact. When the set of cam-operated contacts CS1 is closed, the motor 31 is energized for dispensing the charge of particulate drink ingredient. Cam-operated contacts CS2 are closed for a predetermined time to energize the valve V for delivering the charge of water to be mixed with the drink ingredient, the charge of water being of sufficient volume to only partially fill the cup. With the movable contactor of cam-operated contacts CS3 down on the lower contact, the branch 95 of circuit 91 is completed for holding the timer motor 89 energized through the remainder of the dispensing and rinsing cycles. After the charges of the drink ingredient and the water have been delivered to the blender 15 and mixed therein, the timer motor 89 opens cam-operated contacts CS4 thereby deenergizing the relay K. Contacts KS1 and KS3 return to their open positions and the movable contactor of contacts KS2 closes on the respective upper contact. When relay contacts KS3 return to open position, circuit 103 is broken thereby deenergizing the motor 61 driving the impeller 19 to release the drink from the blender, the drink flowing into the cup 13. Thereafter, the timer motor 89 closes the cam-operated contacts CS5 thereby energizing valve V for supplying the quantity of water for completing the drink and rinsing the mixing and delivery system. Lastly, the timer motor 90 returns the movable contactor of contacts CS3 up on the respective upper contact for deenergizing the timer motor 89 and for resetting the control circuit for the next cycle.

An alternative embodiment of the rinsing system involves a rinse switch RSW in a circuit 105 operable to deenergize the motor 31 during the rinsing cycle, and excludes cam-operated contacts CS5. The operation of the dispensing unit here is the same as the operation of the dispensing unit in the first embodiment, except that during the drink dispensing cycle the cam-operated contacts CS2 are held closed for a second and longer predetermined time for energizing the valve V to deliver a charge of water of sufficient volume to fill the cup 13, and that for the rinsing cycle the rinse switch RSW is moved to open position to deenergize the motor 31 to preclude the dispensing of the drink ingredient. In the rinsing cycle of the second embodiment, the quantity of water for rinsing the mixing and delivery system 11 is supplied from the valve V when the cam-operated contacts CS2 are closed, the quantity of water flowing out of the system 11 as waste water. The alternative embodiment is operable through a rinsing cycle only when the rinse switch RSW is in open position and upon closure of the switch SW. Thus, in this alternative embodiment rinsing may be effected only on a periodic basis, and not necessarily with the dispensing of every drink.

As another alternative, the cam-operated contacts CS5 may be included in the operation along with contacts CS2 and the rinse switch RSW with CS2 functioning to actuate valve V to deliver a charge of water less than the full drink amount on each dispensing cycle, CS5 functioning to actuate valve V to deliver the quantity of water for completing or "tapping off" the drink in the cup, and RSW and CS2 being actuated when desired (e.g., by a serviceman or periodically on a time clock basis) for rinsing in addition to that effected by operation of CS5.

The dispensing unit 3 is adapted for use as a vendor and is also adapted for use as a dispenser without bending, (e.g., for dispensing drinks in a fast-food restaurant). It is also contemplated that the principles of this dispensing unit may be used for a home or office type dispenser, in a type of appliance, for example, wherein the charge of water for the drink is supplied by, pouring an amount of water corresponding to the charge of water into a supply system from which the charge of water is allowed to flow to the blender for mixing with the particulate drink ingredient.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Drink dispensing apparatus comprising a container for holding a supply of a particulate drink ingredient adapted to be mixed with water to constitute a drink, said container having an outlet, means for dispensing a charge of the particulate drink ingredient from the container through the outlet for the mixing of a drink, a mixing and delivery system for receiving the charge of the drink ingredient disposed from the container and a charge of water, mixing the two and delivering the resultant drink into a cup, said system comprising a blender, and means for supplying said charge of water for mixing with said charge of the drink ingredient in the blender, said blender having means for mixing said charges while holding them in the blender and having an outlet for flow of the resultant mixture out of the blender and into a cup after mixing has been completed, the outlet of the blender being a constantly open outlet, said mixing means comprising an impeller rotatable in the blender for mixing the drink ingredient and the water adapted when in operation to impel the water away from the blender outlet thereby to hold the drink ingredient and the water in the blender for the mixing thereof without closing the blender outlet, the blender defining a mixing chamber, the impeller having blades for impelling the water away from the outlet and around the interior periphery of the chamber, the mixing chamber being of non-circular shape in transverse section with certain portions of its interior periphery disposed closely adjacent to the surface of revolution defined by the rotating impeller, and other portions of its interior periphery spaced radially outwardly of the surface of revolution so as to provide spaces between the interior periphery of the mixing chamber and the surface of revolution enabling water to flow back toward the blender outlet after it has been impelled away from the blender outlet, the impeller and said spaces thereby enabling the water to be circulated within the mixing chamber during the mixing of the drink.

2. Drink dispensing apparatus comprising a container for holding a supply of a particulate drink ingredient adapted to be mixed with water to constitute a drink, said container having an outlet, means for dispensing a charge of the particulate drink ingredient from the container through the outlet for the mixing of a drink, a mixing and delivery system for receiving the charge of the drink ingredient dispensed from the container and a charge of water, mixing the two and delivering the resultant drink into a cup, said system comprising a blender, and means for supplying said charge of water for mixing with said charge of the drink ingredient in the blender, said blender having means for mixing said charges while holding them in the blender and having an outlet for flow of the resultant mixture out of the blender and into a cup after mixing has been completed, the outlet of the blender being a constantly open outlet, said mixing means comprising an impeller rotatable in the blender for mixing the drink ingredient and the water adapted when in operation to impel the water away from the blender outlet thereby to hold the drink ingredient and the water in the blender for the mixing thereof without closing the blender outlet, the blender defining a mixing chamber, the impeller having blades for impelling the water away from the outlet and around the interior periphery of the chamber, the mixing chamber being polygonal in transverse section so that spaces are provided between the surface of revolution defined by the rotating impeller and the interior periphery of the mixing chamber to enable water to flow back toward the blender outlet after it has been impelled away from the blender outlet, said spaces being at the corners of the polygonal transverse section, the impeller and said spaces thereby enabling the water to be circulated within the mixing chamber during the mixing of the drink.

3. Drink dispensing apparatus comprising a container for holding a supply of a particulate drink ingredient adapted to be mixed with water to constitute a drink, said container having an outlet, means for dispensing a charge of the particulate drink ingredient from the container through the outlet for the mixing of a drink, a mixing and delivery system for receiving the charge of the drink ingredient dispensed from the container and a charge of water, mixing the two and delivering the resultant drink into a cup, said system comprising a blender, and means for supplying said charge of water for mixing with said charge of the drink ingredient in the blender, said blender having means for mixing said charges while holding them in the blender and having an outlet for flow of the resultant mixture out of the blender and into a cup after mixing has been completed, and a system for delivering a quantity of water to the mixing and delivery system for rinsing it, the outlet of the blender being a constantly open outlet, the blender having an impeller rotatable therein for mixing the drink ingredient and the water adapted when in operation to impel the water away from the blender outlet thereby to hold the drink ingredient and the water in the blender for the mixing thereof without closing the blender outlet, the blender defining a mixing chamber, the impeller being rotatable therein and having blades for impelling the water away from the outlet and around the interior periphery of the chamber, the mixing chamber being of non-circular shape in transverse section with certain portions of its interior periphery disposed closely adjacent to the surface of revolution of the impelleer, and other portions of its interior periphery spaced radially outwardly of the surface of revolution so as to provide spaces between the interior periphery of the mixing chamber and the surface of revolution enabling water to flow back toward the blender outlet after it has been impelled away from the blender outlet, the impeller and said spaces thereby enabling the water to be circulated within the mixing chamber during the mixing of the drink.

4. Drink dispensing apparatus comprising a container for holding a supply of a particulate drink ingredient adapted to be mixed with water to constitute a drink, said container having an outlet, means for dispensing a charge of the particulate drink ingredient from the container through the outlet for the mixing of a drink, a mixing and delivery system for receiving the charge of the drink ingredient dispensed from the container and a charge of water, mixing the two and delivering the resultant drink into a cup, said system comprising a blender, and means for supplying said charge of water for mixing with said charge of the drink ingredient in the blender, said blender having means for mixing said charges while holding them in the blender and having an outlet for flow of the resultant mixture out of the blender and into a cup after mixing has been completed, and a system for delivering a quantity of water to the mixing and delivery system for rinsing it, the outlet of the blender being a constantly open outlet, the blender having an impeller rotatable therein for mixing the drink ingredient and the water adapted when in operation to impel the water away from the blender outlet thereby to hold the drink ingredient and the water in the blender for the mixing thereof without closing the blender outlet, the blender defining a mixing chamber, the impeller being rotatable therein and having blades for impelling the water away from the outlet and around the interior periphery of the chamber, the mixing chamber being polygonal in transverse section so that spaces are provided between the surface of revolution defined by the rotating impeller and the interior periphery of the mixing chamber to enable water to flow back toward the blender outlet after it has been impelled away from the blender outlet, said spaces being at the corners of the polygonal transverse section, the impeller and said spaces thereby enabling the water to be circulated within the mixing chamber during the mixing of the drink.

5. Drink dispensing apparatus comprising a container for holding a supply of a particulate drink ingredient adapted to be mixed with water to constitute a drink, said container having an outlet, means for dispensing a charge of the particulate drink ingredient from the container through the outlet for the mixing of a drink, a mixing and delivery system for receiving the charge of the drink ingredient dispensed from the container and a charge of water, mixing the two and delivering the resultant drink into a cup, said system comprising a blender, and means for supplying said charge of water for mixing with said charge of the drink ingredient in the blender, said blender having means for mixing said charges while holding them in the blender and having an outlet for flow of the resultant mixture out of the blender and into a cup after mixing has been completed, a closure for the outlet of said container to exclude air from entering the container through the outlet, and means for opening the closure upon operation of the dispensing means for the dispensing of the drink ingredient, said means for dispensing the charge of the drink ingredient from the container for the mixing of a drink comprising an auger rotatable in the container and extending to the outlet of the container and an electric motor for driving the auger, the means for opening the closure comprising an armature magnetically attractable to the motor by the magnetic field established by the motor when the motor is energized to drive the auger, the armature being biased to a retracted position relative to the field of the motor when the motor is deenergized and the armature is thereby demagnetized, the closure being controlled by the armature for movement from its closed to its open position when the motor is energized and the armature is thereby attracted to the motor, and for movement to this closed position when the motor is deenergized and the armature is thereupon returned to its retracted position.

6. Drink dispensing apparatus as set forth in claim 5 further comprising means detachably coupling the motor to the auger and means detachably connecting the closure and the armature, whereby the container may be removed.

7. A dispenser for a particulate product comprising a container for holding a supply of the product, said container having an outlet, means for dispensing product from the container through the outlet comprising an auger rotatable in the container and extending to the outlet and an electric motor for driving the auger, a closure for the outlet to exclude moisture from entering the container through the outlet, and means for opening the closure upon operation of the motor comprising an armature magnetically attractable to the motor by the magnetic field established by the motor when the motor is energized to drive the auger, the armature being biased to a retracted position relative to the field of the motor when the motor is deenergized and the armature is thereby demagnetized, the closure being controlled by the armature for movement to its closed position when the motor is deenergized and the armature is thereupon biased to its retracted position.

8. Apparatus for dispensing a particulate product comprising a support, a container for holding a supply of the product, said container having an outlet, the container being removably mounted on the support, an auger rotatable in the container and extending to the outlet for dispensing the product from the container, an electric motor carried by the support for driving the auger, means for detachable coupling the auger to the motor when the container is mounted on the support, said coupling means being disengageable for removal of the container, closure means for the outlet of the container to exclude air from entering the container through the outlet, said closure means being carried by the container and removable with the container, and means for opening the closure upon operation of the motor comprising an armature a portion of which is magnetically attractable to the motor by the magnetic field established by the motor when the motor is energized to drive the auger, said armature being pivotally mounted on the support for rocking movement and being biased to a retracted position relative to the field of the motor when the motor is deenergized and the armature is thereby demagnetized, the closure being controlled by the armature for movement between a closed position when the motor is deenergized and the armature is thereupon biased to its retracted position and an open position when the motor is energized and the armature is thereupon pivoted away from its retracted position.

9. A blender comprising a receptacle having a bottom outlet and an impeller rotatable in the blender formed to impel liquid in the blender away from the outlet when the impeller is in operation, thereby to hold liquid for a drink in the blender without closing the outlet, the liquid draining out through the outlet when the impeller stops, said blender defining a mixing chamber, the impeller having blades for impelling the liquid away from the outlet and around the interior periphery of the mixing chamber, the mixing chamber being of non-circular shape in transverse section with certain portions of its interior periphery disposed closely adjacent to the surface of revolution defined by the rotating impeller, and other portions of its interior periphery spaced radially outwardly of the surface of revolution so as to provide spaces between the interior periphery of the mixing chamber and the surface of revolution enabling the water to flow back toward the blender outlet after it has been impelled away from the blender outlet, the impeller and said spaces thereby enabling the water to be circulated within the mixing chamber during the mixing of the drink.

10. A blender comprising a receptacle having a bottom outlet and an impeller rotatable in the blender formed to impel liquid in the blender away from the outlet when the impeller is in operation, thereby to hold liquid in the blender without closing the outlet, the liquid draining out through the outlet when the impeller stops, said blender defining a mixing chamber, the impeller having blades for impelling the liquid away from the outlet and around the interior periphery of the mixing chamber, the mixing chamber being polygonal in transverse section so that spaces are provided between the surface of revolution defined by the rotating impeller and the interior periphery of the mixing chamber to enable the water to flow back toward the blender outlet after it has been impelled away from the blender outlet, said spaces being at the corners of the polygonal transverse section, the impeller and said spaces thereby enabling the water to be circulated within the mixing chamber during the mixing of the drink.

11. Drink dispensing apparatus comprising a container for holding a supply of a particulate drink ingredient adapted to be mixed with water to constitute a drink, said container having an outlet, means for dispensing a charge of the particulate drink ingredient from the container through the outlet for the mixing of a drink, a mixing and delivery system for receiving the charge of the drink ingredient dispensed from the container and a charge of water, mixing the two and delivering the resultant drink into a cup, said system comprising a blender, and means for supplying said charge of water for mixing with said charge of the drink ingredient in the blender, said blender having means for mixing said charges while holding them in the blender and having an outlet for flow of the resultant mixture out of the blender and into a cup after mixing has been completed, the outlet of the blender being a constantly open outlet, said mixing means comprising an impeller rotatable in the blender for mixing the drink ingredient and the water adapted when in operation to impel the water away from the blender outlet thereby to hold the drink ingredient and the water in the blender for the mixing thereof without closing the blender outlet, the blender defining a mixing chamber, the impeller having blades for impelling the water away from the outlet and around the interior periphery of the chamber, the mixing chamber being of such shape in transverse section that spaces are provided between the surface of revolution defined by the rotating impeller and the interior periphery of the mixing chamber to enable water to flow back toward the blender outlet after it has been impelled away from the blender outlet, the impeller and said spaces thereby enabling the water to be circulated within the mixing chamber during the mixing of the drink, the axis of the blender being generally vertical, the outlet of the blender being at the bottom thereof, said impeller comprising a hub extending along the axis of the blender, the impeller blades extending radially from the hub, each blade having an upper portion inclined upwardly in the direction of rotation of the impeller, a flange at the top of the upper portion extending in the direction of rotation, and a lower portion inclined downwardly in the direction of the rotation of the impeller.

12. Drink dispensing apparatus as set forth in claim 11 wherein said blender has a conical bottom tapering to said opening, said impeller blades each having an upwardly inclined lower edge extending generally parallel to a generatrix of the surface of the conical bottom, thereby enabling the impeller to be spaced closely adjacent the bottom of the blender.

13. Drink dispensing apparatus comprising a container for holding a supply of a particulate drink ingredient adapted to be mixed with water to constitute a drink, said container having an outlet, means for dispensing a charge of the particulate drink ingredient from the container through the outlet for the mixing of a drink, a mixing and delivery system for receiving the charge of the drink ingredient dispensed from the container and a charge of water, mixing the two and delivering the resultant drink into a cup, said system comprising a blender, and means for supplying said charge of water for mixing with said charge of the drink ingredient in the blender, said blender having means for mixing said charges while holding them in the blender and having an outlet for flow of the resultant mixture out of the blender and into a cup after mixing has been completed, and a system for delivering a quantity of water to the mixing and delivery system for rinsing it, the outlet of the blender being a constantly open outlet, the blender having an impeller rotatable therein for mixing the drink ingredient and the water adapted when in operation to impel the water away from the blender outlet thereby to hold the drink ingredient and the water in the blender for the mixing thereof without closing the blender outlet, the blender defining a mixing chamber, the impeller being rotatable therein and having blades for impelling the water away from the outlet and around the interior periphery of the chamber, the mixing chamber being of such shape in transverse section that spaces are provided between the surface of revolution defined by the rotating impeller and the interior periphery of the mixing chamber to enable water to flow back toward the blender outlet after it has been impelled away from the blender outlet, the impeller and said spaces thereby enabling the water to be circulated within the mixing chamber during the mixing of the drink, the axis of the blender being generally vertical, the outlet of the blender being at the bottom thereof, said impeller comprising a hub extending along the axis of the blender, the impeller blades extending radially from the hub, each blade having an upper portion inclined upwardly in the direction of rotation of the impeller, a flange at the top of the upper portion extending in the direction of rotation, and a lower portion inclined downwardly in the direction of the rotation of the impeller.

14. Drink dispensing apparatus as set forth in claim 13 wherein said blender has a conical bottom tapering to said opening, said impeller blades each having an upwardly inclined lower edge extending generally parallel to a generatrix of the surface of the conical bottom, thereby enabling the impeller to be spaced closely adjacent the bottom of the blender.

15. A blender comprising a receptacle having a bottom outlet and an impeller rotatable in the blender formed to impel liquid in the blender away from the outlet when the impeller is in operation, thereby to hold liquid for a drink in the blender without closing the outlet, the liquid draining out through the outlet when the impeller stops, said blender defining a mixing chamber, the impeller having blades for impelling the liquid away from the outlet and around the interior periphery of the mixing chamber, the mixing chamber being of such shape in transverse section that spaces are provided between the surface of revolution of the rotating impeller and the interior periphery of the mixing chamber to enable the water to flow back toward the blender outlet after it has been impelled away from the blender outlet, the impeller and said spaces thereby enabling the water to be circulated within the mixing chamber during the mixing of the drink, the axis of the said blender being generally vertical, the outlet of the blender being at the bottom thereof, said impeller comprising a hub extending along the axis of the blender, the impeller blades extending radially from the hub, each blade having an upper portion inclined upwardly in the direction of rotation of the impeller, a flange at the top of the upper portion extending in the direction of rotation, and a lower portion inclined downwardly in the direction of the rotation of the impeller.

16. A blender as set forth in claim 15 wherein said blender has a conical bottom tapering to said opening, said impeller blades each having an upwardly inclined lower edge extending generally parallel to a generatrix of the surface of the conical bottom, thereby enabling the impeller to be spaced closely adjacent the bottom of the blender.

* * * * *